United States Patent
Jain et al.

(10) Patent No.: US 10,242,322 B2
(45) Date of Patent: Mar. 26, 2019

(54) BROWSER-BASED SELECTION OF CONTENT REQUEST MODES

(71) Applicant: Amazon Technologies, Inc., Reno, NV (US)

(72) Inventors: Saral Jain, Seattle, WA (US); Ameet Nirmal Vaswani, Seattle, WA (US); Matthew Lloyd Trahan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 14/094,537

(22) Filed: Dec. 2, 2013

(65) Prior Publication Data

US 2015/0154506 A1 Jun. 4, 2015

(51) Int. Cl.
*G06N 99/00* (2010.01)
*H04L 29/06* (2006.01)

(52) U.S. Cl.
CPC .......... *G06N 99/005* (2013.01); *H04L 67/42* (2013.01)

(58) Field of Classification Search
USPC ....................................................... 709/203
See application file for complete search history.

(56) References Cited

U.S. PATENT DOCUMENTS

| | | | |
|---|---|---|---|
| 6,185,619 B1 | 2/2001 | Joffe et al. | |
| 6,243,761 B1 * | 6/2001 | Mogul | H04L 29/06 709/217 |
| 7,274,658 B2 | 9/2007 | Bornstein et al. | |
| 8,010,668 B1 | 8/2011 | Rothstein et al. | |
| 8,250,008 B1 * | 8/2012 | Cao | G06Q 30/02 370/392 |
| 8,640,047 B2 * | 1/2014 | Mouton | G06F 3/14 715/784 |
| 2002/0015042 A1 | 2/2002 | Robotham et al. | |
| 2002/0192623 A1 * | 12/2002 | Sather | G09B 7/00 434/118 |
| 2003/0014478 A1 | 1/2003 | Noble | |
| 2003/0046335 A1 | 3/2003 | Doyle et al. | |

(Continued)

OTHER PUBLICATIONS

Haibin Liu, Vlado Keselj, "Combined mining of Web server logs and web contents for classifying user navigation patterns and predicting users' future requests", Jul. 7, 2006, Data & Knowledge Engineering 6 (2007) 304-330.*

(Continued)

*Primary Examiner* — Umar Cheema
*Assistant Examiner* — John Fan
(74) *Attorney, Agent, or Firm* — Knobbe, Martens, Olson & Bear, LLP

(57) ABSTRACT

Features are disclosed for generating request decision models for use by client computing devices to determine request paths or modes for content requests. The request modes may correspond to direct requests (e.g., requests made from a client device directly to a content server hosting requested content) or to indirect requests (e.g., requests made from the client device to the content server via an intermediary system). The request decision models may be trained by a machine learning algorithm using performance data (e.g., prior content load times), contextual information (e.g., state information associated with devices at times content requests are executed), and the like.

23 Claims, 8 Drawing Sheets

(56) References Cited

U.S. PATENT DOCUMENTS

| | | | |
|---|---|---|---|
| 2003/0187995 A1* | 10/2003 | Fok | H04L 29/06 709/227 |
| 2005/0120040 A1 | 6/2005 | Williams et al. | |
| 2005/0240943 A1 | 10/2005 | Smith et al. | |
| 2007/0094325 A1* | 4/2007 | Ih | A63F 13/12 709/203 |
| 2008/0133767 A1 | 6/2008 | Birrer et al. | |
| 2010/0042724 A1 | 2/2010 | Jeon et al. | |
| 2010/0085903 A1* | 4/2010 | Pandey | H04L 12/10 370/311 |
| 2010/0235473 A1 | 9/2010 | Koren et al. | |
| 2010/0325239 A1 | 12/2010 | Khedouri et al. | |
| 2011/0153937 A1* | 6/2011 | Annamalaisami | G06Q 10/10 711/118 |
| 2011/0208838 A1 | 8/2011 | Thomas et al. | |
| 2013/0103785 A1 | 4/2013 | Lyon | |
| 2013/0110637 A1 | 5/2013 | Bott | |
| 2013/0254333 A1 | 9/2013 | Lyon | |

OTHER PUBLICATIONS

International Search Report and Written Opinion in PCT Application No. PCT/US 14/67345 dated Mar. 4, 2015, 12 pages.

\* cited by examiner

BROWSER-BASED SELECTION OF CONTENT REQUEST MODES

BACKGROUND

Computing devices can be used to request content from other computing devices over a communication network. In a common application, a client computing device can request a web page from a server computing device via the internet. Browser application software on the client computing device typically retrieves a requested web page, processes resource identifiers embedded in the web page to generate requests for additional resources (e.g., images, script files, etc.), and renders the content for presentation. From the perspective of a user of a client computing device, a user experience can be defined in terms of the performance and latencies associated with obtaining and rendering the requested network content on the client computing device. Latencies and performance limitations of any of the above processes may diminish the user experience.

Optimizations and other improvements may be implemented to reduce latency and otherwise improve the user experience. For example, some content items may be cached at a client device, and future requests for the content items can be fulfilled from the local cache. As another example, proxy servers may be used to cache content for multiple clients and then pass the content to the clients that originally requested the content. Subsequent requests to the proxy server can be served from the proxy cache if the content is present, rather than requiring retrieval of the content from an origin server. As a further example, content delivery networks ("CDNs") can locate points-of-presence closer (in either a geographic or networking context) to certain client devices. Content requests may be made to the CDN rather than the origin server, and the CDN can fulfill the request more quickly due to being closer to the requesting device. Some proxy servers and other intermediary systems can pre-render or otherwise pre-process content prior to responding to a client request. Such pre-processing enables some of the processing burden to be offloaded from the client device to the intermediary system.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
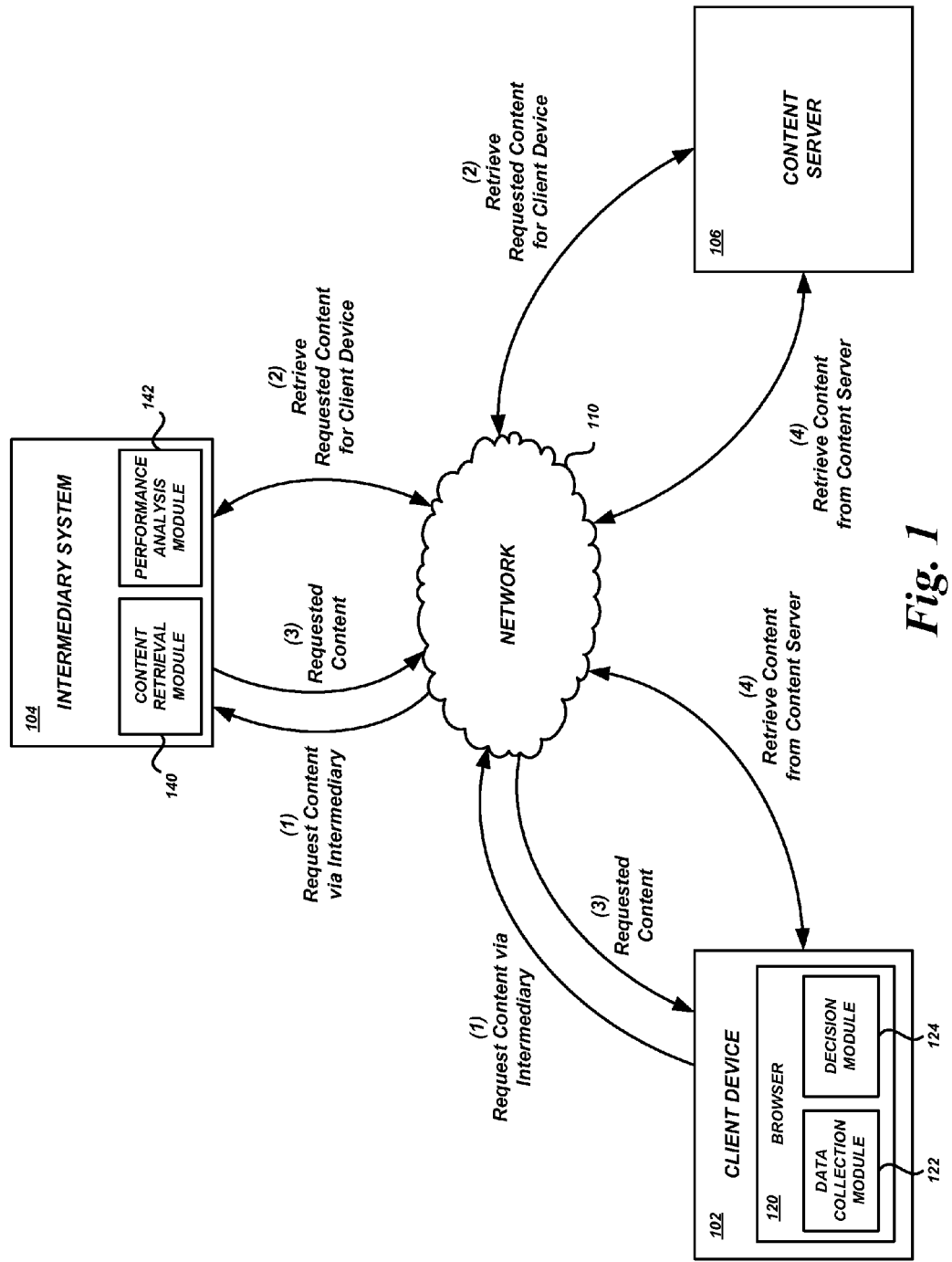
FIG. 1 is a block diagram of an illustrative content delivery environment including a client device, a content server and an intermediary system.

The present disclosure involves an architecture in which client devices/browsers can retrieve some content items directly from origin content servers, and retrieve other content items indirectly through an intermediary system. The intermediary system may provide content caching services, and may also be configured to pre-render or pre-process the content such that a processing burden on the browser is reduced. More specifically, the present disclosure involves computer processes for selecting, for particular content items (e.g., HTML pages) or domains, the request/retrieval mode or path (direct versus indirect) that is likely to produce the best performance from an end user's perspective. The mode selections may be made by the browser, by a server-side component (e.g., of the intermediary system), or both, and may be based on performance criteria related to past requests, current context, or other factors.

Proxy servers generally serve content from a shared proxy cache or proceed to obtain the content from a content server if it is not present in the cache. Certain third party systems that act as intermediaries between client devices and content servers may provide additional processing functionality. For example, some intermediary systems compress, convert, render, or otherwise modify content retrieved on behalf of a client device, and provide a processed response to the client device. Typically, when content is obtained via an intermediary system, a client device (or a browser application executing on the device) is configured to send all content requests to the intermediary. Such configurations do not provide the ability to determine whether to make a content request directly to a content server or through the intermediary based on an analysis of performance data or on a prediction of whether requesting the content via the intermediary will improve performance. Rather, the configurations described above are largely static or are otherwise not responsive to the dynamic nature of network environments. For example, static configurations may not provide the best content retrieval performance in complex network environments, such as the internet, and in environments with constantly changing resource availabilities at the client device, intermediary system, and the like.

Some aspects of the present disclosure are directed to obtaining request performance information from multiple client devices that request content using different request paths. Such data can be used to determine whether request performance (e.g., content load time or some other metric) is better when the client devices make content requests directly to content servers, or when the content requests are made via some intermediary. Client devices (or browser applications executing thereon) can be configured to record performance metrics regarding each content request made from the device, or some subset thereof. For example, a client device may request a particular content item directly from the origin server that hosts the content item. A different client device may request the same content item, but instead of requesting the content directly from the origin server, the request may be made via an intermediary. Each client device may record data regarding request performance, such as the total time it took to load the content as measured from transmission of the request until display of the fully rendered content item. The client devices may transmit the performance data to an analysis system, such as an analysis system that is part of or associated with the intermediary system. The analysis system can aggregate request performance information from many client devices until a statistically significant amount of performance data for a given content item (or group of content items) is obtained for the different request paths. Statistical methods may then be used to determine whether the requests made directly to the origin result in better performance than requests made via the intermediary, or vice-versa.

Additional aspects of the present disclosure relate to generating request configuration information, such as rules or lists regarding which content is to be requested directly from the origin server and/or which content is to be requested via the intermediary. Using the statistical analysis described above and in greater detail below, an analysis system can generate lists of individual content items or groups of content items (e.g., content hosted by individual domains) that are to be requested via the intermediary and/or which content items are to be requested directly from the origin server. The list can be provided to the client devices or otherwise published so that it may be obtained for use by the client devices during subsequent content browsing sessions. For example, the analysis system may generate an updated list periodically, such as every day or every week. Client devices can be configured to obtain the most recent list from the analysis system at the beginning of each browsing session, at the end of each browsing session, or at other scheduled or dynamically determined times. The client devices can use the request configuration information to select between making a direct request or an indirect for a particular content item. By selecting between direct and indirect path options, a browser is selecting between two different content retrieval modes, one of which potentially offloads some of the content processing from the client device.

Further aspects of the present disclosure relate to generating decision models that client devices can use to determine which request path to use for each individual request, rather than tying the determination to specific content items. To facilitate generation of such decision models, data may be obtained from various client devices regarding request performance for particular content items, using particular request paths, under various conditions. For example, information such as the current network bandwidth, current processing load at the intermediary system, characteristics of the requested content, and the like may be obtained. Machine learning may be used to determine which pieces of information are important with respect to request performance. Those pieces of information, or "features," can be used to develop classification or regression models. The models can then be distributed to client devices for use in dynamically determining, on a request-by-request basis, whether to request content directly from content servers or via intermediary systems. The determinations can be more granular than context-agnostic determinations, such as the content-specific determinations made using the request configuration information described above. For example, a client device using classification or regression models can request a particular content item directly from a content server under one set of circumstances (e.g., current metrics regarding network availability, intermediary system load, etc.) and via the intermediary system under another set of circumstances. Information regarding the current state, processing load, and capabilities of the intermediary system may be obtained from the intermediary system on a predetermined or dynamically determined basis in order to fully consider whether a request should be made via the intermediary under the present conditions. Such information about the current capabilities and conditions experienced by the intermediary and/or the client device may be referred to as contextual information. The decision model used by the client device may map particular outcomes (e.g., request performance predictions or request path determinations) to certain patterns of contextual information.

Still further aspects of the present disclosure relate to client devices (or browsers executing thereon) that are configured to develop device-specific request configurations or models for determining request paths. The devices can collect information regarding performance of previous requests and the context in which those requests were made. In order to obtain a statistically significant and sufficiently diverse data set upon which to generate a request configuration or model, the client devices may select request paths for particular content requests at random until a satisfactory data set is obtained. After generating a decision model that can be used to determine which request path to use, the client device may make some requests using a non-preferred request path (e.g., a path other than the path indicated by the model under the present context). This can ensure that sufficient data is available to update or regenerate the model on a continuous, periodic, or ad hoc basis. In some embodiments, such non-preferred request path requests may be designed to fill out areas of a data set that may be deficient. For example, rather than occasionally using a non-preferred request path for a particular request on a random or semi-random basis, the client device may determine the content items, request paths, and contextual information for which additional data is desirable.

Although aspects of the embodiments described in the disclosure will focus, for the purpose of illustration, on specific statistical and machine learning techniques for generating models or deciding among request paths, one skilled in the art will appreciate that the techniques disclosed herein may be applied to any number of services, processes, or applications. For example, statistical and/or machine learning techniques may be used other than those described in detail here. In addition, although the present disclosure focuses on an intermediary system that is configured to provide additional content processing features and services to client devices that use it to obtain content, the techniques described herein may be used with other intermediary systems, such as proxy servers. Furthermore, although the examples in the present disclosure focus on selecting from two request modes (e.g., direct requests and indirect requests), the processes described herein may be used to enable the client devices to intelligently select between three or more request modes. For example, the client devices may select between some or all of the following request modes: (1) direct retrieval from the origin content server; (2) indirect retrieval in which the intermediary system pre-renders content and provides pre-rendered binary versions of content; (3) indirect retrieval in which the intermediary system pre-renders content and provides rendered versions in the form of images, video, or access via a remote communication protocol such as RDP; and (4) indirect retrieval in which the intermediary system does not pre-render content (e.g., the intermediary is a proxy server). As another example, the client device may be able to select between different intermediary systems that offer different content processing or pre-rendering services. Various aspects of the disclosure will now be described with regard to certain examples and embodiments, which are intended to illustrate but not limit the disclosure.

Networked Content Delivery Environment

FIG. 1 illustrates an example content delivery environment in which features can be implemented for generating and using request configuration information and decision models. The content delivery environment shown in FIG. 1 includes a client device 102, an intermediary system 104, and a content server 106. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, a networked content delivery environment may include any number of distinct client devices 102 and/or content servers 106. In addition, multiple (e.g., two or more) intermediary systems 104 may be used. For example, separate intermediary systems 104 may be located so that they are close (in either a geographical or networking sense) to groups of current or potential client devices 102 or content servers 106. In such a configuration, a client device 102 may request content via the intermediary system 104 to which it is closest, rather than all client devices 102 requesting content via a single intermediary system 104.

The client devices 102 can include a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 102 may be configured with a browser application 120 to communicate via the network 110 with other computing systems, such as the intermediary system 104 or content server 106, and to request, receive, process, and display content. The client device 102 or browser application 120 may be associated with the intermediary system 104 or otherwise configured to exchange performance data with, and request content through, the intermediary system 104. The browser application 120 may include a data collection module 122 for collecting request performance data, and a decision module 124 for determining whether to request content directly from the content server 106 or via the intermediary system 104. In some embodiments, the data collection module 122 and/or the decision module 124 may not be integrated with the browser 120, but may instead be separate applications or components, such as browser add-ins or toolbars. In some embodiments, applications other than a browser 120 may include or use a decision module 124 or some similar module to determine which request mode to use when retrieving various content items. For example, content aggregators or other specialized content display applications for mobile devices (e.g., Flipboard) may utilize the decision module 124.

The intermediary system 104 can be a computing system configured to retrieve content on behalf of the client device 102 (and any number of other client devices). For example, the intermediary system 104 can be a server or group of servers that may be accessed via the network 110. In some embodiments, the intermediary system 104 may be a proxy server, a system operated by an internet service provider (ISP), or some other device or group of devices that retrieve content on behalf of client devices 102. In additional embodiments, the intermediary system 104 provides content processing functionality, such as some or all of the content processing functionality typically performed by browser application executing on a client device. For example, the intermediary system 104 may obtain requested content from a content server 106, obtain additional items (e.g., images and executable code files) referenced by the requested content, execute code (e.g., JavaScript) that may be included in the content, render the content for display, and transmit the pre-rendered, pre-executed content item to the client device. By performing some or all of these and other operations at the intermediary system 104, the substantial computing resources and high-speed network connections typically available to network-based server systems may be leveraged to perform the operations much more quickly than would otherwise be possible on a client computing device 102 with comparatively limited processing capability. One example of an intermediary system that provides remote content processing functionality is disclosed in commonly-owned U.S. Pat. No. 8,577,963, issued on Nov. 5, 2013 and entitled "REMOTE BROWSING SESSION BETWEEN CLIENT BROWSER AND NETWORK BASED BROWSER," which is hereby incorporated by reference in its entirety.

The intermediary system 104 can include various components, such as a content retrieval module 140 to obtain content on behalf of client devices (and perform the additional processing operations described above), and a performance analysis module 142 to obtain performance and contextual data and to generate request configuration information or decision models based upon an analysis of the data. The intermediary system 104 may also include a number of data stores (not shown) to store performance and contextual data received from client devices, to store the generated request configuration information and decision models, to cache content retrieved on behalf of the client devices, and the like.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of intermediary system 104 can be combined on one server computing device or separated individually or into groups on several server computing devices. In some embodiments, the intermediary system 104 may include additional or fewer components than illustrated in FIG. 1

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from client devices 102, the intermediary system 104, or other devices or service providers. In some embodiments, one or more content servers 106 may be associated with a CDN service provider, an application service provider, etc.

With continued reference to FIG. 1, example data flows and interactions between the client device 102, intermediary system 104, and content server 106 will be described. A user of a client device 102 may initiate a request for a content item, such as a content page, hosted by the content server 106. The decision module 124 may determine that the request is to be made via the intermediary system 104. For example, the decision module 124 may access request configuration information that maps content items or groups of content items to particular request modes or paths. Illustratively, there may be at least two different request modes or paths: request the content directly from the content server 106, which may be referred to as a "direct request" for convenience; and request the content via the intermediary system 104, which may be referred to as an "indirect request" for convenience (note that a "direct request" may still be transmitted through any number of switches, routers, internet service providers, and the like; it is "direct" in the sense that it is not made to, addressed to, or otherwise transmitted to an intermediary system instead of a content server). In the current example, the request configuration information may indicate that this particular content item, or content items hosted by this particular content server 106, are to be made via the intermediary system 104 (e.g., using indirect requests). As another example, the decision module 124 may use a decision model, such as a classification or regression model, to determine which request mode to use. The decision module 124 may use contextual information, such as information regarding current resource availability at the client device 102, intermediary system 104, or network 110, to make the request mode determination. The request decision model used by the decision module 124 may indicate which request mode is expected to provide the best performance (e.g., if the model is a classification model), or it may produce predictions regarding request performance for each request mode (e.g., if the model is a regression model). Based on the determination made by the decision module 124, the browser 120 may then initiate the request for content via the intermediary system 104 at (1).

In response to the request at (1), the content retrieval module 140 of the intermediary system 104 may retrieve the request content for the client device at (2). In some embodiments, the content retrieval module 140 or some other module or component of the intermediary system 104 can process the content as described in greater detail above. At (3), the intermediary system 104 can provide the requested content to the client device 102.

The browser 120 can perform any remaining processing to the received content and then display the content on the client device 102. The data collection module 122 of the client device 102 can record request performance information about the request. For example, the data collection module 122 can record the duration of time between initiation of the request and display of the received content. The data collection module 122 may also record other information, such as contextual information regarding resource availability at the time of the request.

The user may subsequently initiate a request for the same content item, or a different content item from the same content server 106. The decision module 124 may determine that this time the request should be made using a direct request (e.g., a request sent directly to the content server 106), rather than an indirect request (e.g., a request sent to the intermediary system 104). For example, the context in which the request has been initiated (e.g., available computing resources at the client device 102 or intermediary system 104, current network conditions, etc.) may be different than during the prior request described above. This contextual information, when used by a request decision model, may produce a different result regarding the request mode that should be used. As another example, updated request configuration information may have been received from the intermediary system 104 or some other provider. The updated request configuration information may now indicate that this content item, or content hosted by the content server 106, is to be obtained using a direct request. The client device 102 may therefore retrieve the content from the content server 106 at (4). The browser 120 can process and display the content on the client device 102. As described above with respect to the request made via the intermediary system 104, the data collection module 122 of the client device 102 can record request performance information about the request.

Generation of Request Configuration Information Using Statistical Methods

Figure 2:
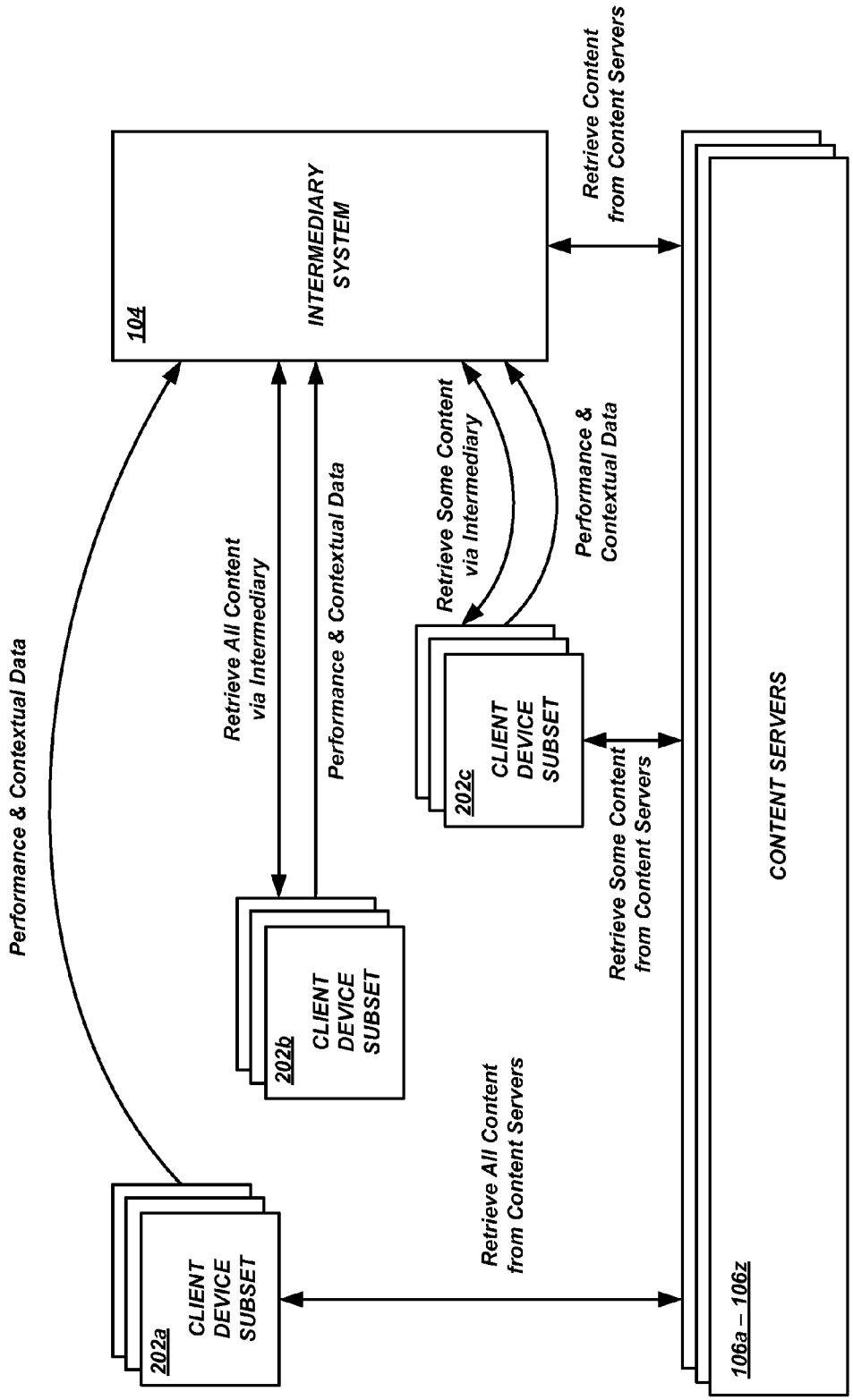
FIG. 2 is a block diagram of illustrative communications and data flows between various client devices, content servers and an intermediary system.

FIG. 2 illustrates example interactions between groups of client devices, an intermediary system, and multiple content servers. The interactions shown may be used to collect data for use by the intermediary system 104 (or a separate analysis system) for use in developing models and request configuration information. In some embodiments, as shown, client devices may be separated into distinct subsets 202a, 202b and 202c. Each subset can be configured to make requests using different request modes and then record request performance information about the requests. The request performance information can be provided to the intermediary system 104 (or a separate analysis system) where it can be used to develop request configuration information, as described in greater detail below.

Illustratively, one client device subset 202a may be configured to use only direct requests (e.g., to make all content requests directly to the corresponding content servers 106a-106z). The client devices in this subset 202a can do so for some period of time, on a periodic or on-demand basis, as determined by the intermediary system 104 or some other entity. Performance and contextual information can be recorded and provided to the intermediary system 104 on a per-request basis or as a batch according to some predetermined schedule or in response to some event, such as a request from the intermediary system 104.

Another client device subset 202b may be configured to make use of only indirect requests (e.g., to make all content requests through the intermediary system 104, rather than directly to the content servers 106a-106z). Client devices in subset 202b may make all requests through the intermediary system 104 on a periodic or on-demand basis as determined by the intermediary system 104 or some other entity. Similar to subset 202a described above, the client devices in subset 202b may record performance and contextual information associated with the requests and provide such information to the intermediary system 104.

An additional client device subset 202c may be configured to make either direct or indirect content requests. The client devices in subset 202c may use request configuration information or a decision model in order to determine whether to request content through the intermediary system 104 or directly from the corresponding content servers 106a-106z. In some embodiments, the client devices in subset 202c may randomly determine whether to make a given request as a direct request or an indirect request. Similar to the subsets 202a and 202b described above, devices in subset 202c can record performance and contextual information for the requests that the devices make, and provide the information to the intermediary system 104.

Figure 3:
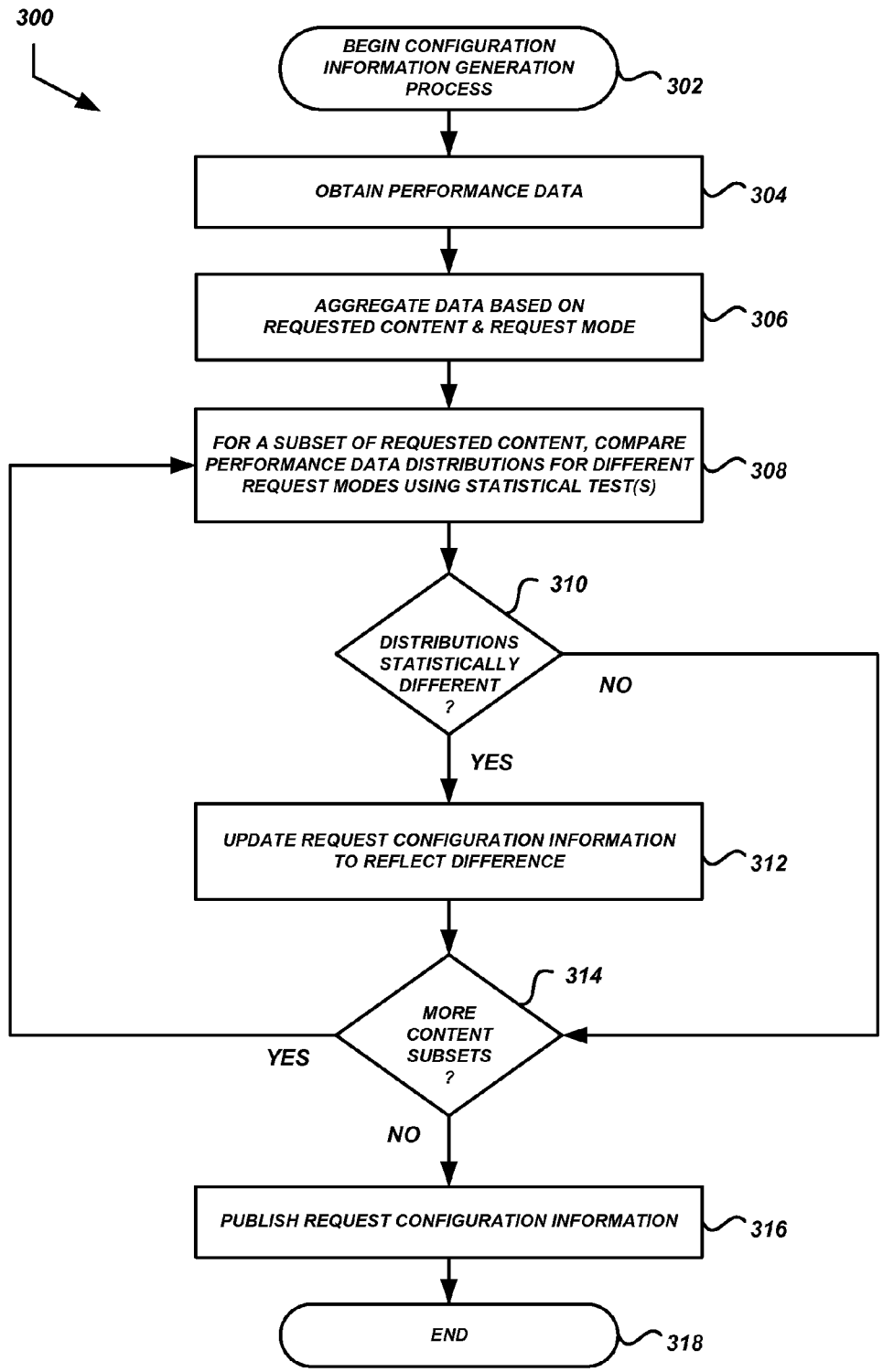
FIG. 3 is a flow diagram of an illustrative process for generating request configuration information.

FIG. 3 illustrates a sample process 300 for generating request configuration information that maps content items or groups to particular request modes. Advantageously, an intermediary system 104 or a separate analysis system may perform the process 300 to generate (or update) request configuration information and then make the request configuration information available to client devices 102.

The process 300 begins at block 302. At block 304, the system performing the process 300 can obtain request performance data 304. As described above, client devices 102 may be configured to provide request performance data to the intermediary system 104. The request performance data can indicate how fast each request was completed (e.g., from request initiate until final content presentation). Performance data that has been received from multiple client devices can be accessed for analysis.

At block 306, request performance data can be aggregated based on the content requested and the request mode used to request the content. For example, request performance data may be received from thousands or millions of client devices, reflecting millions of content requests for various content items. Depending upon how the request configuration information is to be generated, the request performance data can be aggregated on a per-content item basis, or according to groups of content, such as content in a particular domain or hosted by a particular content server 106. In addition, the performance data associated with each of the content items (or groups) may include data for different request modes. The data can therefore be further aggregated according to request mode. For example, request performance data for all direct requests for content item "A" can be aggregated in one group or bucket, request performance data for all indirect requests for content item "A" can be aggregated in a second bucket, request performance data for all direct requests for content item "B" can be aggregated in a third bucket, and so on.

At block 308, a statistical analysis may be performed on the request performance data groups aggregated above. The statistical analysis may be performed to determine whether the content load times (or other performance metrics associated with the requests, such as rendering times) for some subset of content for which sufficient data is available (e.g., a content item or all content in a domain) is substantially better for direct requests or indirect requests. In some embodiments, this determination may be made using a statistical hypothesis test to determine whether the difference in performance between direct and indirect requests is statistically significant, or whether the observed performance difference may have occurred by chance alone. If the difference is statistically significant, then the request mode that exhibited better performance may be chosen as the preferred request mode for future requests for the corresponding content. In some embodiments, if there is an unacceptably high likelihood that the difference in performance is due to random chance alone (e.g., a greater than 1 in 20 likelihood), then no preferred request mode may be chosen.

One method of determining whether the observed difference in performance between direct and indirect requests is statistically significant is to use a t-test, such as the Student's t-test or Welch's t-test. These tests compute a statistic t, which is then used to test the null hypothesis that the difference between the groups is due to random sampling.

Another method of determining whether the observed difference in performance is statistically significant is to use the Mann-Whitney U-test. The Mann-Whitney U-test is a non-parametric alternative to the t-test, and can have better statistical power when the distributions to be tested are heavily skewed (e.g., long-tailed). When working with request performance data such as load time, the distributions of load times for direct and indirect requests may be heavily skewed due to the potentially great lengths of time needed to complete a request and display obtained content. In such cases the Mann-Whitney U-test may provide better results. The Mann-Whitney U-test computes the statistic U, whose distribution under the null hypothesis is known.

The example statistical analyses described above are illustrative only, and are not intended to be limiting. In some embodiments, any appropriate statistical method may be used, either alone or in combination with others, to determine whether the distributions of request performance data (e.g., load times) are statistically significant. The results can then be used to determine whether the performance of indirect requests for a particular content item or group is substantially better than the performance of direct requests, and vice-versa.

At decision block 310, the system performing the process 300 can determine whether the results of the statistical test(s) performed above indicate that any performance difference between direct requests and indirect requests is statistically significant. If so, the process 300 can proceed to block 312. Otherwise, the process 300 can proceed to block 314.

At block 314, request configuration information can be updated to reflect the determination made above. The request configuration information may be a mapping or association of content items/groups to request modes, such that the request mode determined to be statistically better is mapped to or associated with the corresponding content item. In the example above, if it was determined that direct requests for content "A" perform statistically better than indirect requests, the request configuration information may be updated to reflect that content "A" is to be requested directly. In some embodiments, the request configuration information may be a list with entries for (1) content items for which a statistically significant difference has been observed, and (2) a corresponding indicator of which request mode is to be used. In some embodiments, the request configuration information may be limited to a list of only those content items/groups that are to be requested directly, or limited to a list of only content items/groups that are to be requested indirectly. Any appropriate method of listing content items and/or representing a mapping of request modes to content items may be used.

At decision block 314, the system executing the process 300 can determine whether there are additional content subsets to be analyzed. In the present example, if content "A" has been analyzed and content "B" remains to be analyzed, the process 300 may return to block 308 for the statistical analysis of request performance data for content "B." Otherwise, the process 300 may proceed to block 316.

At block 316, the request configuration information may be published or otherwise made accessible to client devices 102, as described in greater detail below. The process 300 terminates at block 318.

In some embodiments, the process 300 may be executed on a periodic basis, such as daily or weekly, so that client devices 102 may routinely access updated request configuration information. In some embodiments, the process 300 may be executed in response to some event, such as an observed change in request performance information from some portion of client devices, or on-demand as initiated by a system administrator.

The process 300 described above or some similar process may be used to generate customized or personalized request configuration information for individual client devices or users. Illustratively, browse history (e.g., which URLs have been visited) may be obtained from a particular client device. Request configuration information may be generated on a URL-specific basis (e.g., a mapping of request modes to individual content items) for each URL visited in a window of time (e.g., the past 30 days), or some subset of the URLs visited in the window (e.g., the 10 most-visited URLs). The statistical analysis used to generate the customized request configuration information may be applied to content load time measures from the particular client device, or from the population of client devices as described above. Domain-specific request modes described above may also be provided for use when a URL that is not in the customized request configuration information is requested. In one specific, non-limiting example, the default or "home" page of frequently visited domains may be mapped to a URL-specific request mode, while the remainder of content requests to those domains may default to the domain-specific request mode.

Figure 4:
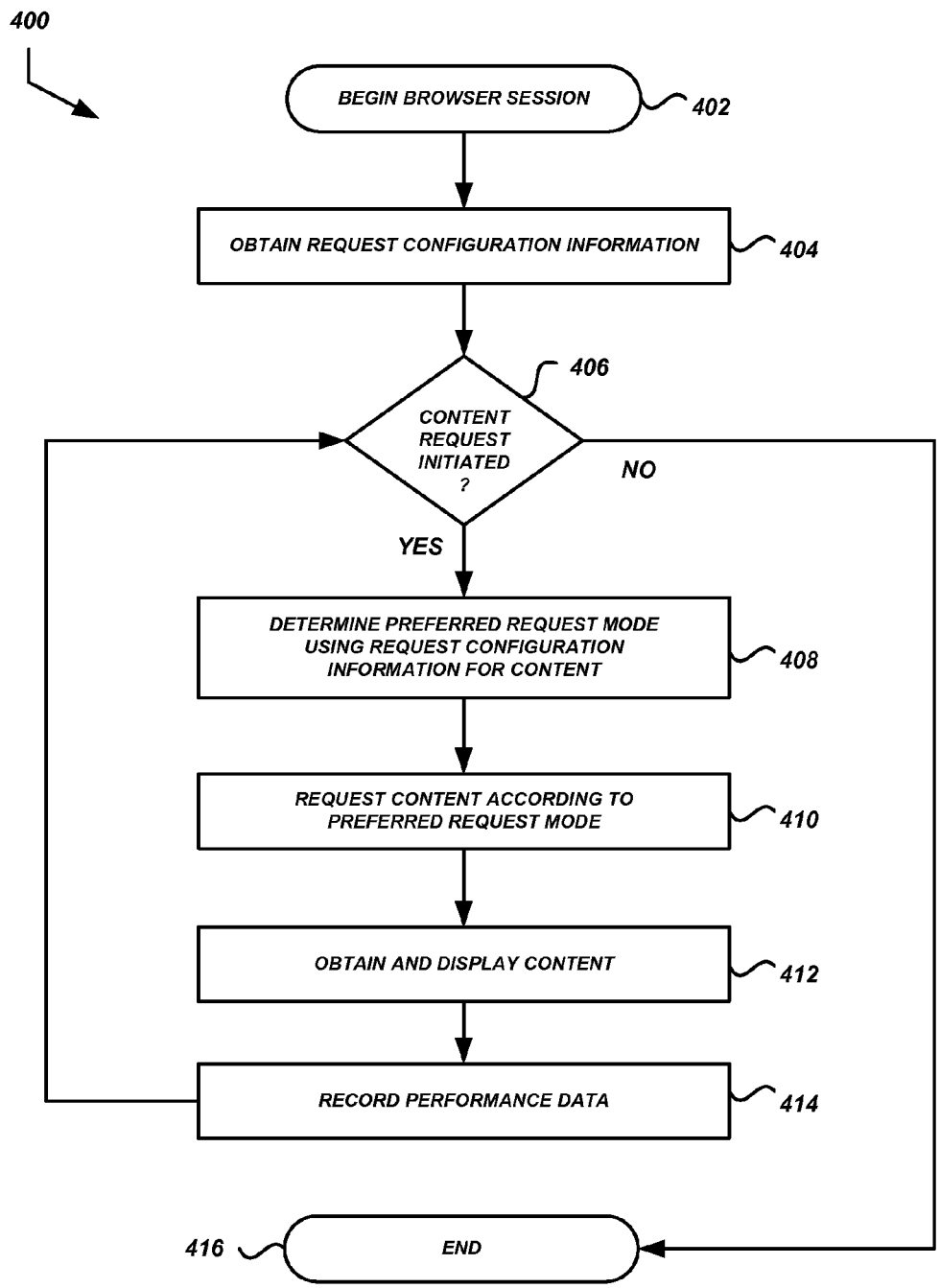
FIG. 4 is a flow diagram of an illustrative process for conducting a browser session using request configuration information.

With reference now to FIG. 4, a process 400 for conducting a browser session using request configuration information will be described. The process 400 may be executed by a browser 120 or some other module or component of a client device 102. The browser 120 may use the process 400 to obtain and use request configuration information that indicates which request mode to use when requesting various content items, as described above.

The process 400 begins at block 402. At block 404, the browser 120 can obtain request configuration information. The request configuration information may be obtained from an intermediary system 104 or from some other source. Although FIG. 4 shows the request configuration information being obtained at the beginning of a browser session, the request configuration information may be obtained at additional or alternate times. For example, the request configuration information may be obtained in connection with a request for content that is made via the intermediary system 104 (e.g., an indirect request), at the end of a browser session, in response to a user request for updated information, at a time determined by the intermediary system 104, etc.

At decision block 406, the browser 120 can determine whether a request has been initiated. If so, the process 400 can proceed to block 408. Otherwise, such as after a predetermined timeout period or in response to some other event (e.g., closing of the browser application 120), the process 400 can terminate at block 416.

At block 408, the decision module 124 or some other module or component can determine whether to request the content directly or indirectly. The determination can be made based on the request configuration information obtained above. For example, a user may initiate a request for content "A." The request configuration information may indicate that content "A" is to be requested directly. Because the direct request is specified by the request configuration information, this may be considered the preferred request mode.

At block 410, the browser 120 can request the content according to the preferred request mode determined above. In the present example, the browser 120 requests content "A" directly from the server hosting the content.

At block 412, the browser 120 can obtain and display the requested content. Displaying the requested content may involve performing operations including parsing, executing code, rendering, and the like as needed. In the present example, because content "A" was retrieved directly from the content server, the browser 120 may perform some or all of these operations prior to display of the content. In another example, if the content was retrieved indirectly via the intermediary system, the content may have been partially or completely processed by the intermediary system as described in greater detail above. By using this request mode, processing may be at least partially offloaded from the client device and the browser 120 may therefore perform fewer processing options. Selection of this particular mode may therefore be based at least partly on the processing capacity of the client device.

At block 414, the data collection module 122 or some other module or component can record request performance data for the current request. Illustratively, the request performance data may include some measurement of loading time, such as the duration of time between initiation of the request and display of the content. In some embodiments, other information may be recorded, such as contextual information, information regarding the processing that was performed or not performed by the client device, and the like. Request performance data may be transmitted to the intermediary system after every request, in a batch after some number of requests or period of time, etc. The intermediary system can use the request performance information during a subsequent execution of the process 300 to generate updated request configuration information.

Generation of Request Decision Models Using Machine Learning Methods

Figure 5:
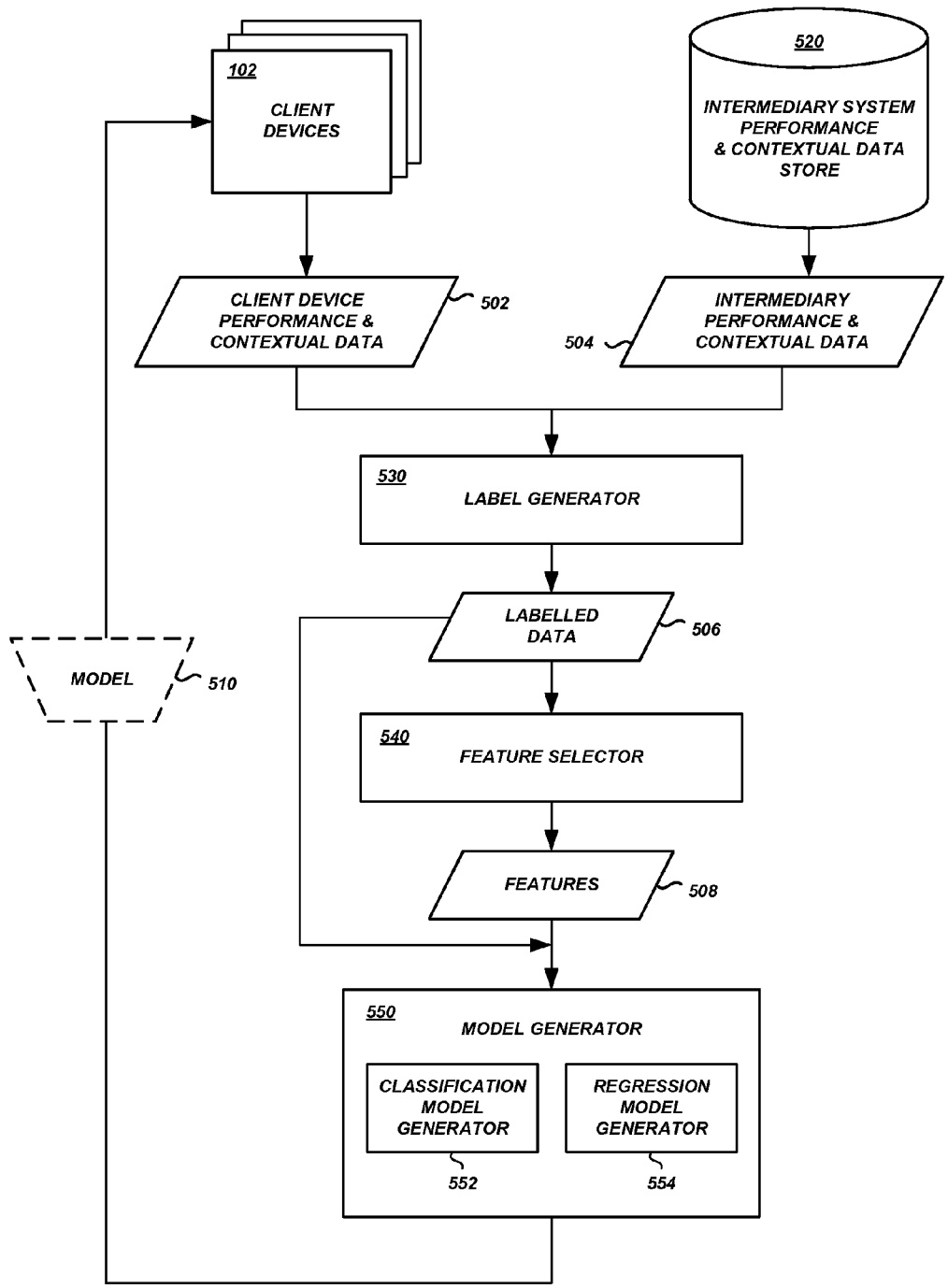
FIG. 5 is a block diagram of illustrative data flows during machine learning and generation of request decision models.

FIG. 5 illustrates example data flows between data sources and processing modules that may occur during generation of a decision model for determining request modes (also referred to herein as a "request decision model" for convenience). A request decision model, such as a decision tree, random forest, support vector machine ("SVM") or regression model may be used by client devices to determine a preferred request mode on a request-by-request basis. Use of such models may require some additional data processing and analysis for each request in comparison with the request configuration information descried above. Decision models can nevertheless provide better performance in some cases due to the additional data that is used. For example, the use of request configuration information may only require determining which request mode has been mapped to the requested content, or whether the requested content is in a direct/indirect request list. The simplicity provided by this method can result in the preferred request mode being determined more quickly than using a decision model that uses input regarding current conditions at the client device, at the intermediary system, etc. in order to determine a preferred request mode. However, because the decision models consider more factors in determining a preferred request mode, the preferred request mode determinations can adjust to dynamically changing conditions which may have a substantial impact on request performance.

Client devices 102 can provide client device performance and contextual data 502 to the intermediary system 104 or some other analysis system. The client device performance and contextual data 502 may be recorded by data collection module 122, similar to the recordation of request performance data described above. Client device performance and contextual data 502 may include metrics and other information regarding the state of the client device at the time of the request, load times for particular content items, and the like. For example, data regarding Wi-Fi connection strength, distance from the client device to the intermediary system, distance from the client device to the content server, network latency from the client device to the intermediary system, network latency from the client device to the content server, network bandwidth, battery power level, CPU usage, disk usage, memory usage, number of applications running, packet loss, congestion window, internet service provider, size of the requested content, whether the requested content was obtained from a CDN, and other data may be recorded. Other examples of client device-specific contextual information include device model, processor model, processor speed, browser, browser version, operating system, and the like.

The intermediary system 104 may record similar information regarding request fulfillment execution, including information about the state of the intermediary system at the time of request fulfillment, load times for particular content items, and the like. The intermediary system 104 may store such data as intermediary performance and contextual data 504 in a data store 520. Illustratively, intermediary performance and contextual data 504 may include data regarding the distance from the intermediary system to the client device, distance from the intermediary system to the content server, network latency from the intermediary system to the client device, network latency from the intermediary system to the content server, network bandwidth, CPU usage at the intermediary system, disk usage at the intermediary system, memory usage at the intermediary system, packet loss, congestion window, internet service provider, size of the requested content, whether the requested content was obtained from a CDN, and the like.

To facilitate generation of a classification model as described below, a label generator 530 may generate labels for training data derived from the client device performance and contextual data 502 and intermediary performance and contextual data 504. Labels are used to indicate the preferred request mode for a particular portion of training data, such as contextual data for a single request. However, one problem with generating labels for data regarding actual requests is that the request was made either directly or indirectly, but not both. Therefore, there is typically no corresponding data point for another request mode against which to determine the preferred request mode for the conditions. For example, a client device 102 may record data regarding execution of a request for content "A" made directly to the content server. However, there is no data regarding a request for content "A" made via the intermediary system 104 at the same time, under the same conditions. In order to circumvent this limitation in the available data, the label generator 530 may be configured to infer or otherwise determine labels based on a variety of criteria.

One technique for inferring, generating, or otherwise determining labels is to calculate a lower and upper percentile threshold for observed load time. For example, if a particular request has a load time faster than the $30^{th}$ percentile (e.g., a load time that is less than 70% of all observed load times or observed load times for the particular content item), then the label generator 530 may determine that the request mode used for the request, whether direct or indirect, was correct and label the data accordingly. Similarly, if the load time is slower than the $70^{th}$ percentile (e.g., a load time that is greater than 70% of all observed load times or observed load times for the particular content item), then the label generator 530 may determine that the request mode used for the request was incorrect and label the data accordingly. For load times between the $30^{th}$ and $70^{th}$ percentiles, the data can be omitted from the training data set, or otherwise labeled with a third label that is neither "correct" nor "incorrect" (e.g., "not sure"). Usage of the $30^{th}$ and $70^{th}$ percentiles is illustrative only; in some embodiments, other percentiles may be used (e.g., $10^{th}$ and $90^{th}$).

Another technique for generating labels is to analyze, for a given content item, only data from devices which have requested the item both directly and indirectly within some time range. For example, as described above and in greater detail below, some devices may randomly choose the "non-preferred" request mode in order to maintain up-to-date data for analysis. As another example, some devices may be instructed to make requests both directly and indirectly for a period of time (e.g., alternate request modes for all requests over the course of a day or a week). In these and other examples, data for both request modes may be obtained from a single client device, and therefore a "correct" or "incorrect" label may be reliably determined on a device-by-device basis.

Yet another technique is to cluster contextual and performance data based on particular features of the data. A common correct label may then be identified based upon the clustered data. For example, if multiple client devices have requested content under similar conditions, as determined by the contextual data associated with the request, then the request data may be clustered based on the similar conditions. A comparison of load times for direct requests and indirect requests for individual content items in the cluster may be made. Labels can then be generated based on the data associated with the different request modes.

The feature selector 540 can obtain the labeled data 506 and perform feature selection on it. Feature selection is the process of identifying which subset of features (e.g., metrics or other data points) in a body of data are most useful for a particular purpose, such as predicting loading times. By performing feature selection on the labeled data 540, the individual features that most affect loading times, both positively and negatively, can be determined (e.g., which features tend to be associated with "incorrect" labels and which features tend to be associated with "correct" labels). The selected features can then be used to train a model for use in predicting loading times or identifying the correct request mode when presented with unlabeled data.

One method of performing feature selection uses the Relief algorithm to remove irrelevant features from a data set. Relevance values can be assigned to features by treating samples (data associated with individual content requests) as points in the feature space. For each sample, the algorithm finds the nearest "hit" (another sample of the same class) and "miss" (a sample of a different class), and adjusts the relevance value of each feature according to the square of the feature difference between the sample and the hit and miss. The K-means algorithm may be used as a redundancy filter by clustering features according to how well they correlate to each other. When feature clusters are discovered, only the features with the highest relevance scores (as calculated using the Relief algorithm) are kept; the other features in the cluster are removed from the feature set.

The model generator 550 can obtain the labeled data 506 and the selected features 508 in order to generate a request decision model for use by client devices 102. The model generator 550 may include a classification model generator 552 and/or a regression model generator 554, depending on the desired output model type. The classification model generator 552 may generate a request classification model that can be used by a client device to determine whether a particular request should be made directly or indirectly under certain conditions which correspond to the features selected above. In some embodiments, the model may be a decision tree-based classification model, such as a random forest, J48, LADtree, or MSP. The regression model generator 554 may generate a request regression model that predicts load times for direct requests and indirect requests under certain conditions which correspond to the features selected above. The client device 102 would then use the request mode that corresponds to the best load time prediction.

The model 510 generated by the model generator 550 can then be provided to the client devices 102, in a manner similar to the publishing of request configuration information described above.

Figure 6:
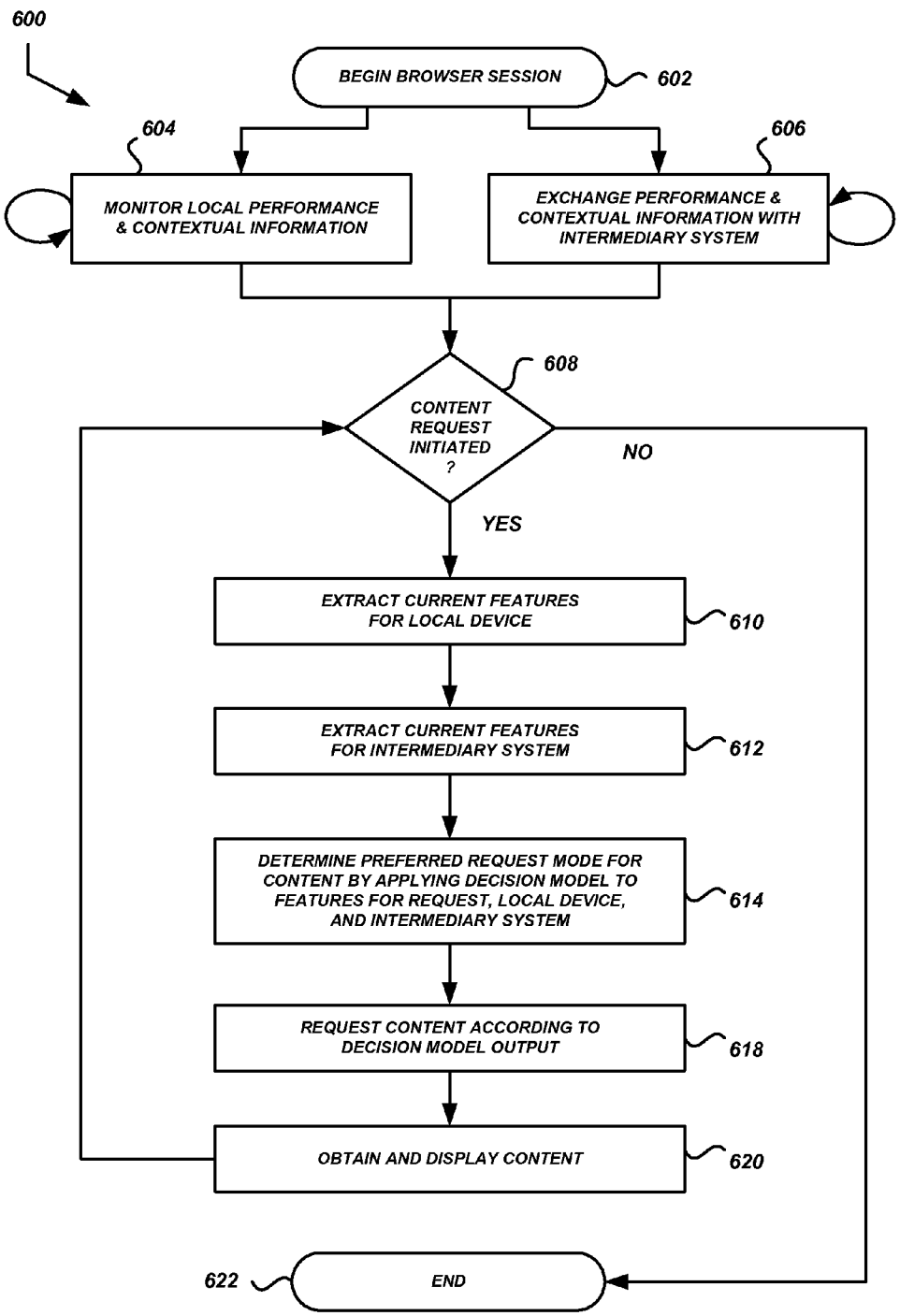
FIG. 6 is a flow diagram of an illustrative process for conducting a browser session using a request decision model.
Figure 7:
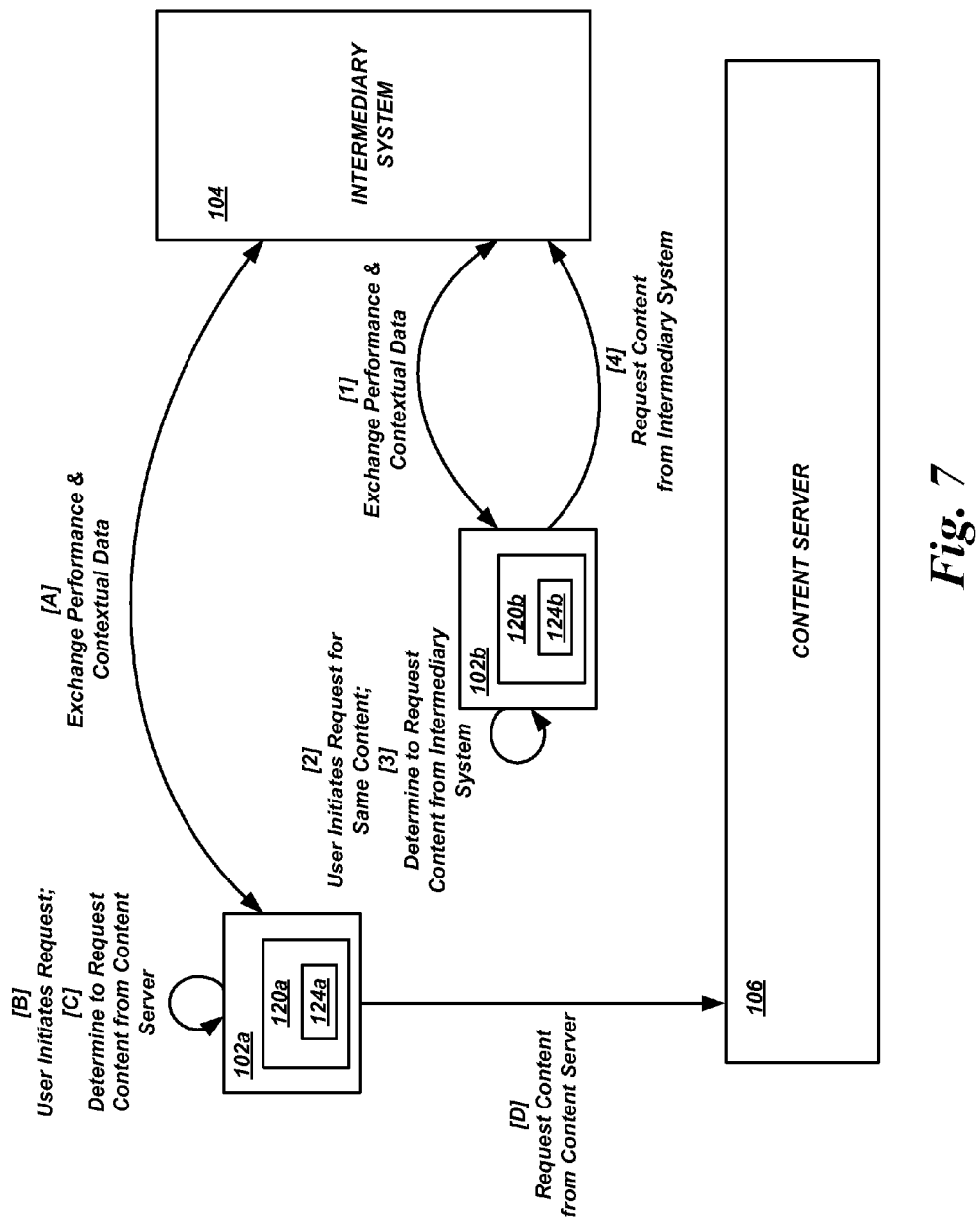
FIG. 7 is a block diagram of illustrative data flows and interactions between client devices, a content server an intermediary system.

FIG. 6 illustrates a process 600 for conducting a browser session using a request decision model, such as the model 510 described above. The process 600 may be executed by browsers 120a, 120b or some other modules or components of client devices 102a, 102b shown in FIG. 7. FIG. 7 illustrates interactions and data flows that may occur when client devices execute the process 600. The browsers 120a, 120b may perform the process 600 to use a request decision model 510 that indicates which request mode to use under various conditions.

The process 600 begins at block 602. At block 604, the browsers 120a, 120b or other modules or components, such as data collection modules, can monitor local performance and contextual information. Metrics regarding the current state of the browsers 120a, 120b and/or client devices 102a, 102b can be periodically or continuously determined in a background process so that when a request is initiated, the metrics are available for use by the request decision model 510. This can reduce or eliminate the need to determine metrics regarding the system state at the time a request is processed.

At block 606, browsers 120a, 120b or other modules or components can exchange performance and contextual information with the intermediary system 104. Metrics regarding the current state of the intermediary system 104 and other information, as described above, can be periodically or continuously obtained (e.g., actively retrieved or passively received) from the intermediary system 104 so that when a request is initiated, the metrics are available for use by the request decision model 510, similar to monitoring the local performance and contextual information above. In addition, the browsers 120a, 120b may provide local performance and contextual information to the intermediary system 104 so that the intermediary system 104 can use the information when updating the request decision model 510.

At decision block 608, the browsers 120a, 120b can determine whether a request has been initiated. If so, the process proceeds to block 610. Otherwise, such as after a timeout period or in response to some other event, the process 600 terminates at block 622.

As shown in FIG. 7, two client devices 102a and 102b exchange performance and contextual information with the intermediary system 104 at [A] and [1], respectively. At [B] and [2], users of the client devices 102a and 102b, respectively, can initiate a request for content hosted by the content server 106.

At block 610 of FIG. 6, the decision modules 124a and 124b can extract current features associated with the local device 102a and 102b. Feature extraction is the process of obtaining data relevant to a particular problem or analysis from a data set. In the present example, features may be extracted from the local performance and contextual information monitored at 604, above. In some embodiments, feature extraction may be performed as part of, or in connection with, the monitoring process above so that it does not need to be performed in response to a request, further saving time and reducing processing load on the client device.

At block 612, the decision modules 124a and 124b can extract current features associated with the intermediary system 104. In the present example, features may be extracted from the performance and contextual information obtained from the intermediary system 104, above. In some embodiments, feature extraction may be performed as part of, or in connection with, the data exchange process to save time and reduce processing load.

At block 614, the decision modules 124a and 124b can determine a preferred request mode for content using the request decision model 510. The request decision model 510 may take as input data regarding the current request (e.g., domain, actual content item requested, etc.), the features for the local device state and performance extracted above, the features for the intermediary system state and performance extracted above, and any other relevant data to determine the preferred request mode.

As shown in FIG. 7, users of the client devices 102a and 102 may have initiated requests for the same content, hosted by the same content server 106, at substantially the same time. Yet the decision modules 124a and 124b may determine different preferred request modes at [C] and [3], respectively. For example, the network connection between client device 102a and the intermediary system 104 may be experiencing unacceptably high latency, the client device 102a may be substantially closer to the content server 106 than to the intermediary system 104, or the like. As a result, the decision module 124a may output a preferred request mode of "direct request." The request decision model 510 may have been trained on data that caused it to learn that under such circumstances the direct request will produce the best performance. In contrast, as shown, the decision module 124b of the other client device 102b may output a preferred request mode of "indirect request." For example, the network connection between the client device 102b and the intermediary system 104 may be extremely fast, the client device 102b may be substantially closer to the intermediary system 104, etc.

At block 620, the browsers 120a, 120b can obtain and display the requested content. Displaying the requested content may involve performing operations including parsing, executing code, rendering, and the like as needed. In the present example, because browser 120a retrieved the content directly from the content server 106, the browser 120a may perform some or all of these operations prior to display of the content. However, because browser 120b retrieved the content indirectly via the intermediary system 104, the content may have been partially or completely processed by the intermediary system 104 as described in greater detail above. The browser 120b may therefore perform fewer processing options.

Generation of Request Configurations and Decision Models at Client Devices

Figure 8:
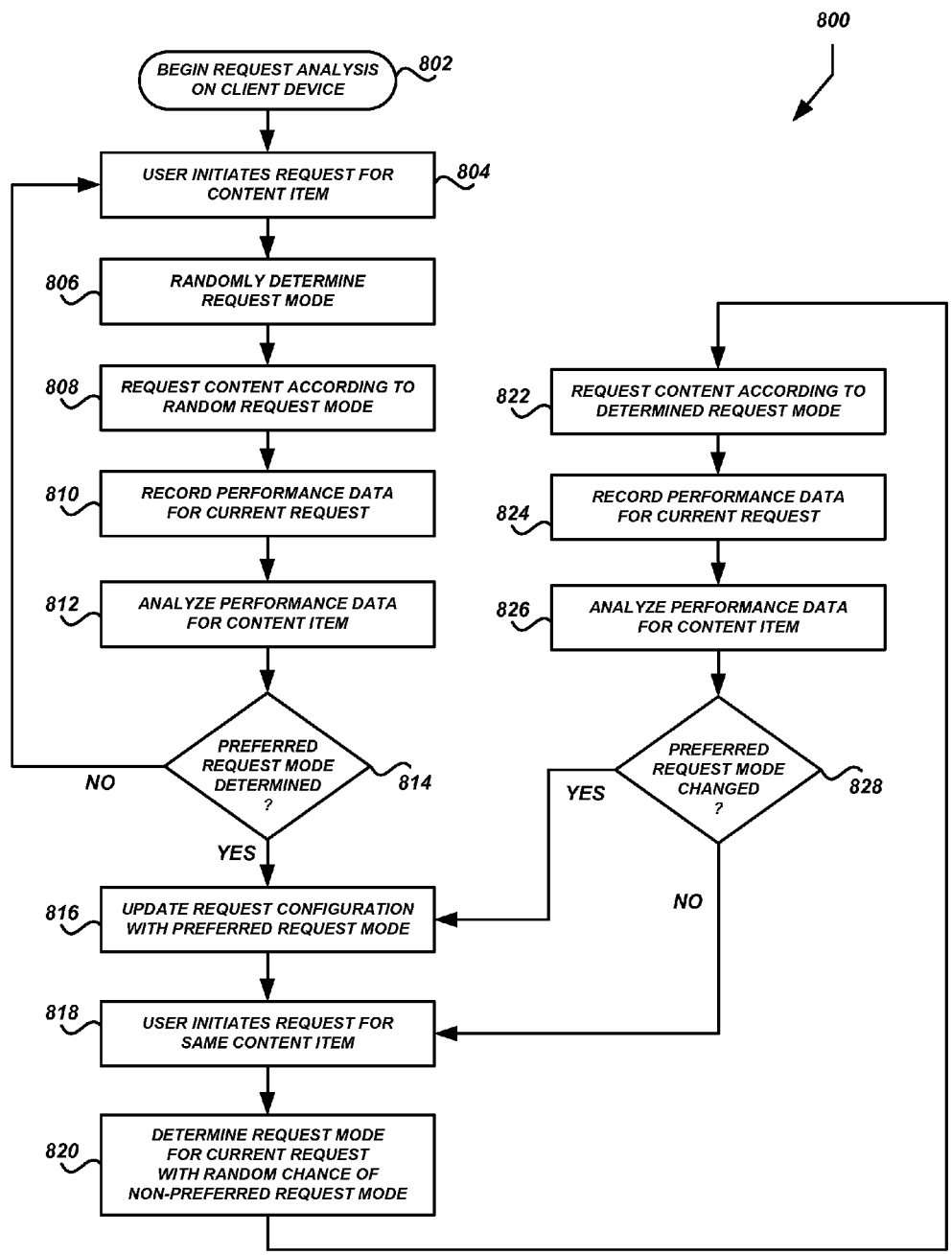
FIG. 8 is a flow diagram of an illustrative process for generating a request decision model using data maintained at a client device.

FIG. 8 illustrates a process 800 for obtaining a statistically significant or otherwise satisfactory amount of data with which to generate or update request configuration information or a request decision model at a client device. Advantageously, the request configuration information/decision model can be based on data directly related to request processing and load times on the client device 102 that will use the request configuration information/decision model, potentially providing more accurate results for the particular client device 102 than the multi-device techniques described above. In some embodiments, the process 800 may be performed by browsers 120 which have not yet obtained or developed a request configuration or request decision model, and also by browsers 120 which have well-developed request configurations or decision models.

The process 800 begins at block 802. At block 804, a user of a client device 102 may initiate a request for a content item. For example, the user may initiate a request for content "A" hosted by a content server 106.

At block 806, the decision module 124 or some other module or component of the client device 102 may randomly determine the request mode (e.g., direct or indirect) for the current request. The random determination may be based on a random number generator or some other randomizing algorithm or process. By randomly determining the request mode and recording performance information about the randomly determined requests, the client device 102 may obtain a statistically significant or otherwise satisfactory amount of data for each request mode that can then be used to generate or modify a request configuration or request decision model. In some embodiments, rather than randomly determining the request mode for every request at block 806, the decision module 124 may instead alternate request modes or use some other technique to ensure variety with respect to request mode.

At block 808, the content can be requested according to the request mode determined above. In the present example, if the decision module 124 determined to request content "A" directly, the request for content "A" may be transmitted directly to the content server 106 associated with content "A."

At block 810, the data collection module 122 or some other module or component of the client device 102 may record performance data (e.g., content load time measurements) associated with the current request. The performance data may be stored in some data store of the client device 102, transmitted to the intermediary system 104, or otherwise stored for future use. In some embodiments, the data collection module 122 may also record contextual information regarding the state of the client device 102 at the time of the request.

At block 812, a statistical analysis, such as one of the analyses described above, may be performed on the recorded performance data and/or contextual data. Such an analysis may be performed if the browser 120 is configured to use request configuration information (e.g., a list of content items mapped to preferred request modes, or some other listing as described above). If the browser 120 is configured to use a request decision model, then the data may be labeled and used to train the model.

At block 814, the browser 120 can determine whether a new preferred request mode has been determined when using request configuration information, or whether an update to the request decision model may be made when using a request decision model. If the request configuration/decision model can be updated, the process 800 proceeds to block 816. Otherwise, the process 800 may return to block 804.

At block 816, the update determined above can be applied to the request configuration information for the content item (or to the request decision model, as appropriate).

At block 818, the user can initiate a request for the same content item (or content from the same domain). In the present example, the user initiates another request for content "A."

At block 820, the decision module 124 can determine the request mode for the current request with a random chance of using the non-preferred request mode. Typically, the decision module 124 will choose the preferred request mode in order to obtain the benefits of the previous analysis. However, at random times, the non-preferred request mode can be chosen so that the client device 102 can record performance information when using the non-preferred request mode. This information may be used to verify the proper preferred request mode has been determined, or to change the preferred request mode based on changing conditions.

At block 822, the browser 120 can request the content according to the request mode determined above. At block 824, performance data and/or contextual data regarding the request may be recorded for the request mode used at block 822.\

At block 826, the browser 120 or some other module or component may analyze the performance data to determine whether the preferred request mode should be changed. For example, the statistical analysis described above can be performed again to determine whether to update the request configuration information. In some embodiments, more recent data may be weighted more heavily in the statistical analysis than older data. In some embodiments, data older than some threshold amount of time may be deleted or excluded from the statistical analysis.

At decision block 828, the browser 120 or some other module or component can determine whether the preferred request mode is to be modified. If so, the process 800 returns to block 816. Otherwise, the process 800 returns to block 818.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes described with respect to FIGS. 3, 4, 6 and 8 may be embodied in a set of executable program instructions stored on one or more non-transitory computer-readable media, such as one or more disk drives or solid-state memory devices, of the client device or a computing system with which the intermediary system is associated. When a process is initiated, the executable program instructions can be loaded into memory, such as RAM, and executed by one or more processors of the client device or computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
a server comprising one or more computer processors programmed by the executable instructions to at least:
obtain performance data reflecting load times for a plurality of content requests, wherein at least a first portion of the content requests are made from a first group of client devices to content servers, wherein at least a second portion of the content requests are made from a second group of client devices to an intermediary system, and wherein the intermediary system serves as an intermediary between the content servers and the second group of client devices;
obtain contextual information regarding one or more performance parameters of the intermediary system and at least a portion of the first or second groups of client devices at times corresponding to individual requests of the plurality of content requests; and
generate a request decision model by using a machine learning algorithm to process the performance data and the contextual information,
wherein the request decision model is configured to determine, for a subsequent content request made by a client device, that the subsequent content request is to be made using a first type of request, for a first version of requested content, to a content server and not the intermediary system if a performance parameter of the intermediary system or the client device satisfies a first criterion,
and wherein the request decision model is further configured to determine, for the subsequent content request, that the subsequent content request is to be made using a second type of request, for a second version of requested content, to the intermediary system if the performance parameter of the intermediary system or the client device satisfies a second criterion, wherein at least a portion of content rendering tasks are offloaded from the client device to the intermediary system and the intermediary system provides, to the client device, the second version of requested content as content at least partially pre-rendered from the first version of requested content.

2. The system of claim 1, wherein the request decision model is further configured to determine that the subsequent content request is to be made to the content server based at least partly on a performance parameter of the intermediary system satisfying a third criterion, wherein a performance parameter of the client device satisfies the first criterion.

3. The system of claim 1, wherein the request decision model comprises a classification model or a regression model.

4. The system of claim 1, wherein the one or more computer processors are further programmed by the executable instructions to infer labels for at least a portion of the contextual information based at least partly on the corresponding content load times.

5. A computer-implemented method comprising:
as implemented by a server system comprising one or more computing devices,
generating model training data based at least partly on:
request performance data regarding content load times for a plurality of content requests from client devices to content servers; and
contextual data regarding one or more performance parameters, of at least a portion of the client devices or an intermediary system, at times corresponding to individual requests of the plurality of content requests, wherein the intermediary system serves as an intermediary between the client devices and the content servers; and
generating a request decision model using the model training data,
wherein the request decision model determines, for a content request made by a client device, that the content request is to be made using a first type of request, for a first version of requested content, to a content server and not the intermediary system if a performance parameter of the client device or the intermediary system satisfies a first criterion,
and wherein the request decision model determines, for the content request, that the content request is to be made using a second type of request, for a second version of requested content, to the intermediary system if the performance parameter of the intermediary system or the client device satisfies a second criterion, wherein at least a portion of content rendering tasks are offloaded from the client device to the intermediary system and the intermediary system provides, to the client device, the second version of requested content as content at least partially pre-rendered from the first version of requested content.

6. The computer-implemented method of claim 5, wherein generating the request decision model comprises using a machine learning algorithm.

7. The computer-implemented method of claim 5, wherein the request decision model comprises a classification model or a regression model.

8. The computer-implemented method of claim 5, further comprising determining labels for at least a portion of the contextual data based at least partly on the corresponding content load times.

9. The computer-implemented method of claim 5, further comprising determining labels for at least a portion of the contextual data based at least partly on a comparison of content load times associated with two or more requests made by a single client device.

10. The computer-implemented method of claim 5, wherein the request decision model is further configured to determine that the content request is to be made to the content server based at least partly on a performance parameter of the intermediary system satisfying a third criterion, wherein a performance parameter of the client device satisfies the first criterion.

11. The computer-implemented method of claim 5, wherein the request decision model is further configured to determine that the content request is to be made via the intermediary system based at least partly on a performance parameter of the intermediary system satisfying a third criterion, wherein a performance parameter of the client device satisfies the second criterion.

12. The computer-implemented method of claim 5, further comprising:
receiving, from the client device, additional request performance data regarding content load times; and
generating an updated request decision model based at least partly on the additional request performance data.

13. One or more non-transitory computer storage media having stored thereon a browser module configured to execute on a client computing device, the browser module configured to implement at least:
a first content request mode in which the client computing device retrieves a first version of requested content from a content server and not an intermediary system that operates as an intermediary between client computing devices and content servers; and
a second content request mode in which the client computing device retrieves a second version of the requested content from the intermediary system, wherein the intermediary system at least partially pre-renders the second version of the requested content from the first version of the requested content;
wherein said browser module is configured to use a decision model to select between the first and second content request modes for retrieving content items,
wherein the decision model indicates, for retrieval of a particular content item, that the first content request mode is to be selected if a performance parameter of the client computing device or the intermediary system satisfies a first criterion, and
wherein the decision model indicates, for retrieval of the particular content item, that the second content request mode is to be selected if the performance parameter of the intermediary system or the client computing device satisfies a second criterion, wherein at least a portion of content rendering tasks are offloaded from the client computing device to the intermediary system and the intermediary system provides content at least partially pre-rendered to the client device.

14. The one or more non-transitory computer storage media of claim 13, wherein the browser module comprises one of: an application; a browser toolbar; or a browser add-in.

15. The one or more non-transitory computer storage media of claim 13, wherein the decision model indicates that the first content request mode is to be selected based at least partly on a performance parameter of the intermediary system satisfying a third criterion, wherein a performance parameter of the client computing device satisfies the first criterion.

16. The one or more non-transitory computer storage media of claim 13, wherein the decision model indicates that the second content request mode is to be selected based at least partly on a performance parameter of the intermediary system satisfying a third criterion, wherein a performance parameter of the client computing device satisfies the second criterion.

17. The non-transitory computer storage medium of claim 13, wherein the browser module configures the client computing device to perform operations including transmitting, to the intermediary system, request performance data regarding a content load time associated with one or more content requests.

18. The non-transitory computer storage medium of claim 13, wherein the browser module configured the client computing device to perform operations including:
receiving an updated decision model from the intermediary system; and
using the updated decision module to select one of the first or second content request modes for a content request.

19. A system comprising:
an intermediary system comprising at least one server machine, wherein the intermediary system is configured to operate as an intermediary between user devices and origin content servers and to provide content pre-rendering services that offload content processing tasks from the user devices and provide content at least partially pre-rendered to the user devices;
a browser module that runs on the user devices, wherein the user devices are configured by the browser module to use a decision model to determine whether to (1) retrieve a content item using a first type of request, for a first version of the content item, from an origin content server and not the intermediary system, or (2) retrieve the content item using a second type of request, for a second version of the content item, from the intermediary system, wherein the intermediary system generates the second version of the content item by at least partially pre-rendering the first version of the content item, and wherein the decision model predicts, based at least partly on whether a performance parameter of a user device or the intermediary system satisfies a criterion, whether use of the second type of request to retrieve the content item will improve content loading performance from an end user perspective; and
a decision model generator that runs on a computing system comprising at least one server machine or user device, wherein the computing system is configured by the decision model generator to use aggregated content-loading performance data to generate the decision model.

20. The computer-implemented method of claim 5, wherein the performance parameter comprises at least one of: network bandwidth, network latency, network packet loss, CPU usage, memory usage, or capability to process requested content.

21. The system of claim 1, wherein the request decision model is configured to select between two alternate content request paths based on an assessment of which of the two alternate content request paths is likely to provide better performance for content being requested, wherein a first content request path of the two alternate content request paths includes the intermediary system, and wherein a second content request path of the two alternative content request paths does not include the intermediary system.

22. The non-transitory computer storage medium of claim 13, wherein the browser module configures the client computing device to perform operations including:
determining to transmit a request for a content item using the second content request mode; and
receiving, in response to the request, a response that has been at least partially pre-rendered by the intermediary system, wherein the response comprises an image, generated by the intermediary system, of the content item.

23. The system of claim 19, wherein the intermediary system is configured to generate a pre-rendered version of requested content comprising at least one of:
an image of the requested content, a video of the requested content, or a view of the requested content on a remote desktop of the intermediary system.

* * * * *

UNITED STATES PATENT AND TRADEMARK OFFICE
CERTIFICATE OF CORRECTION

PATENT NO. : 10,242,322 B2
APPLICATION NO. : 14/094537
DATED : March 26, 2019
INVENTOR(S) : Saral Jain Page 1 of 1

It is certified that error appears in the above-identified patent and that said Letters Patent is hereby corrected as shown below:

In the Claims

In Column 23, Line 8, Claim 17, change "The non-transitory computer storage medium" to --The one or more non-transitory computer storage media--.

In Column 23, Line 14, Claim 18, change "The non-transitory computer storage medium" to --The one or more non-transitory computer storage media--.

In Column 23, Line 15, Claim 18, change "configured" to --configures--.

Signed and Sealed this
Second Day of July, 2019

Andrei Iancu
*Director of the United States Patent and Trademark Office*